(12) United States Patent  
De Vita

(10) Patent No.: US 12,253,652 B2
(45) Date of Patent: Mar. 18, 2025

(54) LENS COATING LAYER HAVING THREE OR MORE SUB-LAYERS OF OXIDE OR FLUORIDE

(71) Applicant: COERENT S.R.L., Legnano (IT)

(72) Inventor: Matteo De Vita, Nerviano (IT)

(73) Assignee: COERENT S.R.L., Parabiago (IT)

( * ) Notice: Subject to any disclaimer, the term of this patent is extended or adjusted under 35 U.S.C. 154(b) by 1017 days.

(21) Appl. No.: 16/961,573

(22) PCT Filed: Jan. 11, 2019

(86) PCT No.: PCT/IB2019/050214
§ 371 (c)(1),
(2) Date: Jul. 10, 2020

(87) PCT Pub. No.: WO2019/138363
PCT Pub. Date: Jul. 18, 2019

(65) Prior Publication Data
US 2021/0063611 A1    Mar. 4, 2021

(30) Foreign Application Priority Data

Jan. 11, 2018 (IT) .......................... 102018000000730

(51) Int. Cl.
*C09D 1/00* (2006.01)
*C09D 5/00* (2006.01)
(Continued)

(52) U.S. Cl.
CPC .................. *G02B 1/14* (2015.01); *C09D 1/00* (2013.01); *C09D 5/00* (2013.01); *C09D 5/006* (2013.01); *G02B 1/115* (2013.01)

(58) Field of Classification Search
CPC ......... G02B 1/11–118; G02B 1/14; G02B 1/18
See application file for complete search history.

(56) References Cited

U.S. PATENT DOCUMENTS

| 5,168,003 | A | | 12/1992 | Proscia |
| 5,928,718 | A | * | 7/1999 | Dillon ...................... G02B 1/14 |
| | | | | 427/407.1 |

(Continued)

FOREIGN PATENT DOCUMENTS

| CN | 103492914 A | 1/2014 |
| WO | 2000031569 A1 | 6/2000 |

OTHER PUBLICATIONS

Search Report and Written Opinion of PCT/IB2019/050214 of Aug. 16, 2019.

(Continued)

*Primary Examiner* — Ryan S Dunning
(74) *Attorney, Agent, or Firm* — Silvia Salvadori, P.C.; Silvia Salvadori

(57) ABSTRACT

The present invention relates to a lens having a refractive index $\eta\iota$ coated at least partially on at least one of its surfaces with a layer of an anti-scratch lacquer having a refractive index $r\backslash 2$ lower than $\eta\text{-}\iota$, wherein between said lens and said layer of anti-scratch lacquer a coating layer comprising at least 3 sub-layers of at least one compound selected from the group consisting of Zirconium oxide, Silicon oxide, Titanium oxide, Tantalum oxide, Iridium oxide, Silver oxide and Magnesium fluoride is present, and wherein each of said at least 3 sub-layers has a thickness of lower than or equal to 100 nm. The invention also relates to a method for reducing or eliminating the iridescence phenomenon of a lens coated with an anti-scratch lacquer layer having a refractive index lower than the refraction index of the lens.

19 Claims, 4 Drawing Sheets

(51) Int. Cl.
G02B 1/115 (2015.01)
G02B 1/14 (2015.01)

(56) References Cited

U.S. PATENT DOCUMENTS

| | | | |
|---|---|---|---|
| 7,037,573 B2 * | 5/2006 | Miyatake | G02B 1/111 |
| | | | 428/206 |
| 7,567,734 B2 * | 7/2009 | Dai | G01N 21/4133 |
| | | | 385/32 |
| 9,164,262 B2 * | 10/2015 | Chen | G02B 1/11 |
| 2009/0098409 A1 | 4/2009 | Yamada et al. | |
| 2014/0327876 A1 | 11/2014 | Hugenberg et al. | |
| 2015/0020745 A1 * | 1/2015 | Imamura | A01K 63/003 |
| | | | 119/265 |
| 2015/0062704 A1 * | 3/2015 | Henky | G02B 27/0006 |
| | | | 359/512 |
| 2015/0355380 A1 * | 12/2015 | Apitz | C23C 14/3414 |
| | | | 427/164 |

OTHER PUBLICATIONS

Office Action issued Sep. 13, 2022 in connection to counterpart European Patent application No. 19704455.5-1020.
Letter of Chinese agent reporting office action issued in connection with counterpart chinese application No. 2019800185422.
Office Action issued on Jun. 20, 2022 in connection to counterpart Chinese Patent Application No. 2019800185422.

* cited by examiner

LENS COATING LAYER HAVING THREE OR MORE SUB-LAYERS OF OXIDE OR FLUORIDE

This application is a U.S. national stage of PCT/IB2019/050214 filed on 11 Jan. 2019, which claims priority to and the benefit of Italian Patent Application No. 102018000000730 filed on 11 Jan. 2018, the contents of which are incorporated herein by reference in their entireties.

FIELD OF INVENTION

The invention relates to a coating layer for a lens having a determined refractive index which improves its qualities while reducing the iridescence phenomenon when treated for its final use with a coating having a refractive index lower than that one of the lens.

STATE OF THE ART

A lens is an optical transmission device that has the property of concentrating or diverging light rays. The lens is a support characterized by a determined refractive index.

The lenses are characterized by two opposite surfaces ideally constituted by portions of spherical or aspherical surfaces having curvature radii $R_1$ and $R_2$. The lenses are made of different materials. The lens is usually made of glass or plastic materials, for example polycarbonate. Therefore, the first step in the manufacture of the lens is the choice of the material, which can be glass, a mineral crystal such as quartz or beryllium, or a plastic material. The lenses can have different refractive indices depending on the manufacture material and typically they have a refractive index ranging from 1.5 to 1.90. In order to considerably reduce the thickness of the lens, especially in the presence of high dioptres or other ocular pathologies, it is felt the need to use lenses with a high refractive index. However, lenses with the above characteristics are very expensive and therefore it is appropriate to cover them with protective lacquers. Consequently, on the lens, and preferably on both of its two surfaces, an anti-scratch lacquer layer is provided having tipically thickness of few microns. The anti-scratch lacquers also exhibit a refractive index. To date, anti-scratch lacquers with indices of 1.50, 1.58, 1.60 and 1.67 are known. Therefore, in the lens coated with the anti-scratch lacquer layer, the difference in refractive indices between the base lens and the anti-scratch lacquer causes the iridescence phenomenon.

Iridescence is an optical property of some surfaces that, when illuminated, take on a range of different shades depending on the angle of observation and the thickness of the layers involved.

In the iridescence phenomenon, the light that illuminates a surface is reflected with different shades depending on the observation angle. This is due to the interference between subsequent light reflections on very thin and semi-transparent surface layers of the body crossed by the light.

The incident light on a layer is partly reflected according to the refractive index. In presence of two layers with different refractive indices, the reflected beams created by the two layers have different phases and interfere, amplifying or attenuating some colors. The amplified colors are different according to the observation angle determining the appearance, similar to a rainbow, of the observed body.

Iridescence is also known to comprise the formation of Newton's rings. The formation of the Newton's rings is a phenomenon in which an interference pattern is created by the reflection of light between two surfaces, having different refractive indices. Newton's rings appear as a series of concentric rings, being alternate dark and bright.

It is therefore known that the formation of Newton's rings can appear as a geometrical physical effect between two layers of material having the same refractive index but having air in-between; or as an optical effect between two layers having perfect adhesion but with different refractive indices.

It is also known that a lens with a refractive index commonly equal to 1.74, having above 3 or 4 µm of an anti-scratch lacquer having a refractive index of 1.50, has an iridescence of about 5% with very visible Newton's rings.

If a layer of lacquer with the same lens refractive index was used, the problem of iridescence would certainly be negligible. However, since the lens refractive index is always higher than the one of the lacquer normally used, the iridescence phenomenon is inevitable.

This iridescence phenomenon is therefore negative for a lens coated with an anti-scratch lacquer layer. Furthermore, the situation can be worsened by the presence of a further anti-reflection layer, which is done after the application of the anti-scratch lacquer, in order to increase the lens transmittance. In fact, the further layer increases the iridescence phenomenon also compromising the anti-reflection properties of the added layer, worsening the aesthetic effect in presence of frontal light.

It is known that in order to eliminate the problem of iridescence, and in particular the Newton's rings, it would be necessary to have an anti-scratch lacquer layer having a refractive index close to that of the lens, i.e around 1.70, or preferably 1.74. However, anti-scratch lacquers with such a high refractive index are not available at present, since it would be extremely expensive to produce them, at the expense of the efficiency and stability of the layer itself. In fact, the lacquers with a higher refractive index have a duration generally 3 times lower than the lacquers with a low refractive index. It is evident that a shorter duration results in more unused product to be disposed of. Moreover, providing a lacquer with a refractive index suitable for each type of lens evidently involves different methods of preparation of the lacquer itself and also different lens coating methods, determining an excessive cost of the final coated lens manufacture. In fact, the high index lacquers in addition to lasting less, have costs 8 or 10 times higher than those with a low refractive index.

Therefore, the object of the present invention is to provide lenses coated with anti-scratch lacquers and, optionally, with anti-reflection layers, which have a low or almost absent iridescence or Newton's rings, while optimizing at the same time the transmittance properties of the lens and not only improving its aesthetic effect, but also preventing possible medical eye pathologies resulting from excessive frontal light.

A further object is to provide a method for decreasing the iridescence of a lens coated with anti-scratch lacquer.

SUMMARY OF THE INVENTION

The inventors of the present invention have surprisingly discovered that if they employ some materials and apply them in layers having determined thickness on one of the two surfaces of a lens having a determined refractive index $\eta_1$ they can cancel the iridescence phenomenon and the Newton's rings, when said lens is coated with a layer of anti-scratch lacquer having a refractive index $\eta_2$ lower than that of the lens.

Therefore the invention relates to a lens having a determined refractive index $\eta_1$ coated at least partially on at least one of its surfaces with a layer of an anti-scratch lacquer having a refractive index $\eta_2$ lower than $\eta_1$ wherein between said lens and said anti-scratch lacquer a coating layer comprising at least 3 sub-layers of at least one compound selected from the group consisting of Zirconium oxide, Silicon oxide, Titanium oxide, Tantalum oxide, Iridium oxide, Silver oxide and Magnesium fluoride is present, and wherein each of said at least 3 sub-layers has a thickness lower than or equal to 100 nm.

Specifically, the inventors have discovered that, if they insert between the lens and the anti-scratch lacquer a layer made of at least 3 sub-layers of one or more compounds of Zr oxide, Si oxide, Ti oxide, Ta oxide, Ir oxide, Ag oxide and Magnesium fluoride with application techniques that allow to obtain sub-layers with a thickness of lower than or equal to 100 nm, preferably in the range from 2 to 80 nm, they can drastically reduce or completely cancel the iridescence.

Therefore, in another aspect the invention relates to a method for reducing or eliminating the iridescence phenomenon of a lens having a determined refractive index coated at least partially on at least one surface thereof with an anti-scratch lacquer layer having a refractive index $\eta2$, lower than that one of the lens itself, said method comprising the following steps:

a) Providing a lens having a determined refractive index $\eta_1$;
b) Applying at least partially on at least one of the two surfaces of the lens a coating layer comprising at least 3 sub-layers of at least one compound selected from the group consisting of Zirconium oxide, Silicon oxide, Titanium oxide, Tantalum oxide, Iridium oxide, Silver oxide and Magnesium fluoride by a technique which ensures a thickness of each of said at least 3 sub-layers lower than or equal to 100 nm;
c) Applying on said coating layer obtained in step b) an anti-scratch lacquer layer having a refractive index $\eta_2$ lower than $\eta_1$.

In the present invention when indicating:
"lens having a determined refractive index $\eta_1$" it is intended any optical lens, characterized by two opposite spherical or aspherical surfaces with curvature radii $R_1$ and $R_2$, preferably ocular, subject to the iridescence phenomenon when coated, at least partially, with an anti-scratch lacquer layer having a refractive index $\eta_2$ lower than that one of the optical lens itself;
"a surface of the lens" or "a surface thereof" it is intended one of the surfaces of the lens;
applying "at least partially on at least one surface" of the lens, it is intended an application of the layer covering at least 80% of at least one surface of the lens, preferably higher than 95%, more preferably 100% of one of the two surfaces of the lens;
"anti-scratch lacquer" it is intended a material having a refractive index $\eta_2$ lower than that one of the lens and generally used for protective purposes of the lens itself. Among the anti-scratch lacquers, photochromic lacquers and coloured lacquers can also be comprised.

In an advantageous embodiment of the invention, the application/deposition technique, which ensures a thickness of said sub-layer of at least one said compound lower than or equal to 100 nm, is a technique having a deposition precision of at least 0.5 nm of thickness, such as PVD (Physical Vapor Deposition). In a preferred and advantageous embodiment of the invention said coating layer comprises from 3 to 11 sub-layers, preferably 7 sub-layers of at least one compound selected from the group consisting of Zirconium oxide, Silicon oxide, Titanium oxide, Tantalum oxide, Iridium oxide, Silver oxide and Magnesium fluoride. Since the compounds forming the sub-layers have different refractive indices, the layer comprising the at least 3 sub-layers corresponds to a combination of sub-layers having different refractive index.

In a preferred embodiment of said coating layer, said at least 3 sub-layers of a compound are present as a combination of the repetition of the alternance of a sub-layer of a compound having higher refractive index and of a sub-layer having a refractive index lower than the lens refractive index. When in the present invention reference is made to a compound having a higher or lower refractive index, it is meant taking the lens as a reference.

In a further embodiment of the invention the lens, coated according to the invention with a layer of one or more compounds and with an anti-scratch lacquer, can be further coated with a further layer having refractive index different from the lens and from the anti-scratch lacquer, such as for example an anti-reflection coating layer or further a top coat with water/oil repellent properties on the anti-scratch lacquer layer. The properties deriving from the presence of the coating layer of the invention allow to improve the characteristics of the reflected and transmitted light delving from the presence of these further layers.

DETAILED DESCRIPTION OF THE INVENTION

Figure 1:
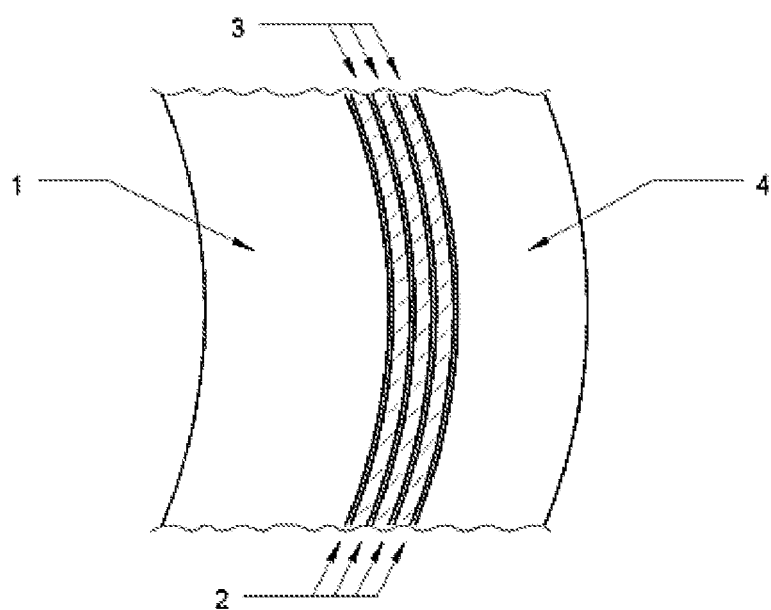
FIG. 1 shows the scheme of the final lens of Example 1, coated with anti-scratch lacquer having a refractive index lower than that one of the lens.

The invention therefore concerns a lens having a determined refractive index coated at least partially on at least one surface thereof with an anti-scratch lacquer layer having a refractive index $\eta_2$ lower than $\eta_1$ wherein between said lens and said anti-scratch lacquer layer a coating layer comprising at least 3 sub-layers of at least one compound selected from the group consisting of Zirconium oxide, Silicon oxide, Titanium oxide, Tantalum oxide, Iridium oxide, Silver oxide and Magnesium fluoride is present, and wherein each of said at least 3 sub-layers has a thickness of lower than or equal to 100 nm.

Preferably the lens has a refractive index in the range from 1.50 to 1.90, preferably from 1.70 to 1.90, more preferably is about 1.74.

Preferably said anti-scratch lacquer layer can also be a photochromatic lacquer or a coloured lacquer which has a refractive index lower than that one of the lens. The compounds comprised in the coating layer are Zirconium oxide, Titanium oxide, Silicon oxide, Tantalum oxide, Iridium oxide, Silver oxide and Magnesium fluoride.

Preferably, the at least 3 sub-layers are made of Zirconium oxide, Silicon oxide and Titanium oxide.

These three preferred oxides have different refractive indices.

Zirconium oxide ($ZrO_2$) has a refractive index in the range of 2.05 to 1.95.

Silicon oxide ($SiO_2$) has a refractive index in the range of 1.47 to 1.46.

Titanium oxide ($TiO_2$) may be in form of rutile or anatase. If it is in form of rutile, it has a refractive index of 2.72, while in form of anatase, it has a refractive index in the range of 2.25 to 2.5.

In a preferred and advantageous embodiment of the invention, said coating layer comprises from 3 to 11 sub-layers, preferably from 7 to 9, more preferably 7, being each sub-layer made of a single compound selected from the group consisting of Zirconium oxide, Silicon oxide, Titanium oxide, Tantalum oxide, Iridium oxide, Silver oxide and Magnesium fluoride.

By means of the application/deposition of 3 layers it is possible to drastically reduce the iridescence phenomenon of a lens coated with anti-scratch lacquer. By adding further sub-layers to obtain from 4 to 11, preferably from 7 to 9, more preferably 7 sub-layers, this phenomenon is completely cancelled. In fact, the inventors believe that by adding more than 9 sub-layers, the thickness and therefore the stress on the lens are excessively increased, worsening accordingly the final characteristics of the lens itself. Since the sub-layers-forming compounds have different refractive indices, the layer comprising the at least 3 sub-layers may correspond to a combination of sub-layers having different refractive index, if the sub-layers are made of different compounds.

Preferably said at least 3 sub-layers are different and are combined to form the coating layer of the invention.

In a preferred embodiment of said coating layer the at least 3 sub-layers are present as a combination of the repetition of alternance of a sub-layer of a compound having a higher refractive index and a sub-layer of compound having a lower refractive index than the lens refractive index.

More preferably said coating layer comprises an alternance of sub-layers of compounds, even more preferably said layer comprises from 3 to 11, more preferably 7 sub-layers.

Said coating layer has at least 3 sub-layers having a thickness lower than or equal to 100 nm, more preferably from 2 to 80 nm, even more preferably from 5 to 50 nm. The thickness measurement is determined by the application/deposition technique used in the manufacture of the final lens itself. For example, the PVD (Physical Vapor Deposition) technique.

Without being bond to any theory, the inventors believe that the presence of the coating layer, made of at least 3 sub-layers, more preferably of Zr oxide, Ti oxide or Si oxide, and having a thickness lower than or equal to 100 nm, allows to drastically reduce the iridescence and therefore the formation of the Newton rings for an optical effect.

In an advantageous embodiment the at least 3 sub-layers are made of different compounds.

In a preferred embodiment of said coating layer the at least 3 sub-layers are present as a combination of the repetition of the alternance of a sub-layer of a compound with a higher refractive index and a sub-layer of a compound with a refractive index lower than the lens refractive index.

More preferably, said layer presents an alternance of sub-layers of zirconium and silicon, respectively, having a higher and lower refractive index with respect to the refractive index of the lens.

The coating layer of the invention is therefore present between the lens and the anti-scratch lacquer layer having a refractive index $\eta_2$ lower than $\eta_1$ so that the coated lens has reduced or absent iridescence and Newton's rings.

According to the invention, therefore, the coated lens can be coated at least partially, preferably completely, with an anti-scratch lacquer. In turn, the lens coated with anti-scratch lacquer can be coated with a layer of anti-reflection agent, and/or with a further coating layer with water/oil repellent properties.

Specifically, the inventors hence inserted between the lens, having a refractive index $\eta_1$, and the anti-scratch lacquer, having a refractive index $\eta_2$ lower than a coating layer, at least partially, on at least one of the two surfaces of the lens, said coating layer comprising at least 3 sub-layers of one or more compounds selected from the group consisting of Zr oxide, Si oxide, Ti oxide, Ta oxide, Ir oxide, Ag oxide and Magnesium fluoride with application techniques which allow to obtain sub-layers having a thickness of lower than or equal to 100 nm, preferably in the range from 2 to 80 nm. In this way the inventors are able to drastically reduce or completely cancel the iridescence generated by the difference of the refractive indices determined by the materials used for the preparation of the lens coated with anti-scratch lacquer.

In another aspect, therefore, the invention relates to a method for reducing or eliminating the iridescence phenomenon of a lens having a determined refractive index coated at least partially on at least one surface thereof with a layer of anti-scratch lacquer having a refractive index $\eta_2$, lower than that of the lens itself, said method comprising the following steps:

a) Providing a lens having a determined refractive index $\eta_1$;

b) Applying at least partially on at least one of the two surfaces of the lens a coating layer comprising at least 3 sub-layers of at least one compound selected from the group consisting of Zirconium oxide, Silicon oxide, Titanium oxide, Tantalum oxide, Iridium oxide, Silver oxide and Magnesium fluoride by a technique which ensures a thickness of each of said at least 3 sub-layers lower than or equal to 100 nm;

c) Applying on said coating layer obtained in step b) an anti-scratch lacquer layer having a refractive index $\eta_2$ lower than $\eta_1$.

In step a) a lens having a refractive index is provided. Lenses, preferably common ocular optical lenses, are generally made of materials which have a refractive index on the range from 1.5 to 1.9, preferably 1.7-1.9, more preferably have a refractive index of about 1.74.

As indicated above, in order to considerably reduce the thickness of the lens, especially in presence of high dioptres or other ocular pathologies, it is felt the need to use lenses with a high refractive index. Therefore, ocular optical lenses have commonly refractive indices between 1.7 and 1.9.

In step b) the coating layer is applied at least partially on at least one surface of the lens.

More preferably, said coating layer is applied on the entire surface of the lens, i.e. 100% of at least one surface thereof.

The step b) of the coating layer application/deposition provides for the application/deposition of at least 3 sub-layers of at least one compound selected from the group consisting of Zr oxide, Si oxide, Ti oxide, Ta oxide, Ir oxide, Ag oxide and Magnesium fluoride.

In an advantageous embodiment of the invention, the application/deposition technique, which ensures a thickness of each of said at least 3 sub-layers lower than or equal to 100 nm, is a technique having a deposition precision of at least 0.5 nm of thickness, such as for example PVD (Physical Vapor Deposition).

However, other application/deposition techniques such as ALD (Atomic Layer Deposition), CVD (Chemical Vapor Deposition), PECVD (Plasma Enhanced Chemical Vapor Deposition) may be envisaged.

In a preferred and advantageous embodiment of the invention said sub-layers of at least one compound selected from the group consisting of Zirconium oxide, Silicon oxide, Ti oxide, Ta oxide, Ir oxide, Ag oxide and Magnesium fluoride are from 3 to 11, preferably 7-9, more preferably 7. Each sub-layer comprises at least one single compound selected from the group consisting of Zirconium oxide, Silicon oxide, Titanium oxide, Tantalum oxide, Iridium oxide, Silver oxide and Magnesium fluoride.

Since zirconium, silicon and titanium oxides exhibit different refractive indices, step b) can provide for the application/deposition of the layer as application/deposition phase of at least 3 sub-layers as a combination of sub-layers having different refractive indices.

In a preferred embodiment of the method of the invention the sub-layers of a compound are applied as a combination of the repetition of the alternance of a sub-layer of a compound with a higher refractive index and a sub-layer of a compound with a lower refractive index than the lens refractive index.

Among the compounds for the layer with refractive index higher than the refractive index of a common lens, can be mentioned Zirconium oxide, Titanium oxide and Tantalum oxide.

Among the compounds for the layer having lower refractive index than the refractive index of a common lens, silicon oxide and magnesium fluoride can be mentioned.

Therefore, on a surface of the lens provided in step a), there may be present sub-layers of a compound, each of which with a thickness lower than or equal to 100 nm, applied in step b) by means of an application/deposition technique having a deposition precision of 0.5 nm, preferably PVD.

For example, on an optical lens a layer comprising a zirconium oxide sub-layer having a higher refractive index than the lens refractive index can be applied, subsequently a silicon oxide sub-layer having a refractive index lower than the lens refractive index and again a Zirconium layer, having a refractive index higher than the refractive index of the lens. This combination of sub-layers can therefore be advantageously repeated 2 to 3 times, preferably 2. In step c), the anti-scratch lacquer layer having a refractive index lower than the lens refractive index can then be applied on the coating layer, thus obtaining a coated lens with reduced or null iridescence.

In the method of the invention, in step c) an anti-scratch lacquer is preferably applied in micrometre thicknesses, more preferably from 1 to 4 micrometres. The lacquer thicknesses are also determined by the application technique of the lacquer itself, for example with an immersion lacquering plant.

In a further preferred embodiment of the invention, when a lens, having a refractive index coated according to the invention with a layer of one or more compounds and with an anti-scratch lacquer having a refractive index lower than that one of the lens, is further coated with a further layer having refractive index different from the lens and from the anti-scratch lacquer, such as an anti-reflection upper coating, and/or a top coat with water/oil repellent properties on the anti-scratch lacquer layer, the invention provides for a step d) of application/deposition of said further coatings.

The invention will now be described with reference to two embodiments of the coated lens of the invention and of the method of the invention for illustrative and non-limiting purposes thereof.

EXPERIMENTAL PART

Example 1

A MR-174 lens having a refractive index of 1.74 was provided.

By means of the PVD technique, using the PVD Satis 900 DL instrument in vacuum conditions at $1.0 \times 10^{-5}$ mbar, the following oxide sub-layers were deposited in sequence, on one of the two lens surfaces in order to form the final coating layer:

| Coating Layer | Refractive Index Lens 1.74 | Thickness (nm) |
|---|---|---|
| Zirconium dioxide ($ZrO_2$) | 1.95-2.05 | 10.0 |
| Silicon dioxide ($SiO_2$) | 1.46-1.47 | 25.0 |
| Zirconium dioxide ($ZrO_2$) | 1.95-2.05 | 21.2 |
| Silicon dioxide ($SiO_2$) | 1.46-1.47 | 39.3 |
| Zirconium dioxide ($ZrO_2$) | 1.95-2.05 | 15.5 |
| Silicon dioxide ($SiO_2$) | 1.46-1.47 | 49.8 |
| Zirconium dioxide ($ZrO_2$) | 1.95-2.05 | 5.0 |

The anti-scratch lacquer Crystal Coat MP 1154 D from SDC having a refractive index of 1.51 was then applied on the coating layer, until a final thickness of the lacquer layer of 4000.0 nm by means of the Dipping Immersion Lacquering plant from SCL.

FIG. 1 shows the scheme of the prepared lens with the coating layer and the anti-scratch lacquer. Specifically, the layer indicated with 1 is the lens, the four Zirconium oxide sub-layers of the coating layer (preferably with refractive index of 2.05) are indicated with number 2, the three Silicon oxide sub-layers of the coating layer (preferably with a refractive index of 1.46) are indicated with number 3, the anti-scratch lacquer layer is indicated with number 4.

The lens thus coated with also the anti-scratch lacquer was evaluated for the iridescence phenomenon using a Shimadzu UV-2401 PC spectrophotometer.

At the same time, a comparison was made, i.e. the same lens coated with the same anti-scratch lacquer according to the prior art, namely not having the coating layer of the invention.

Figure 2:
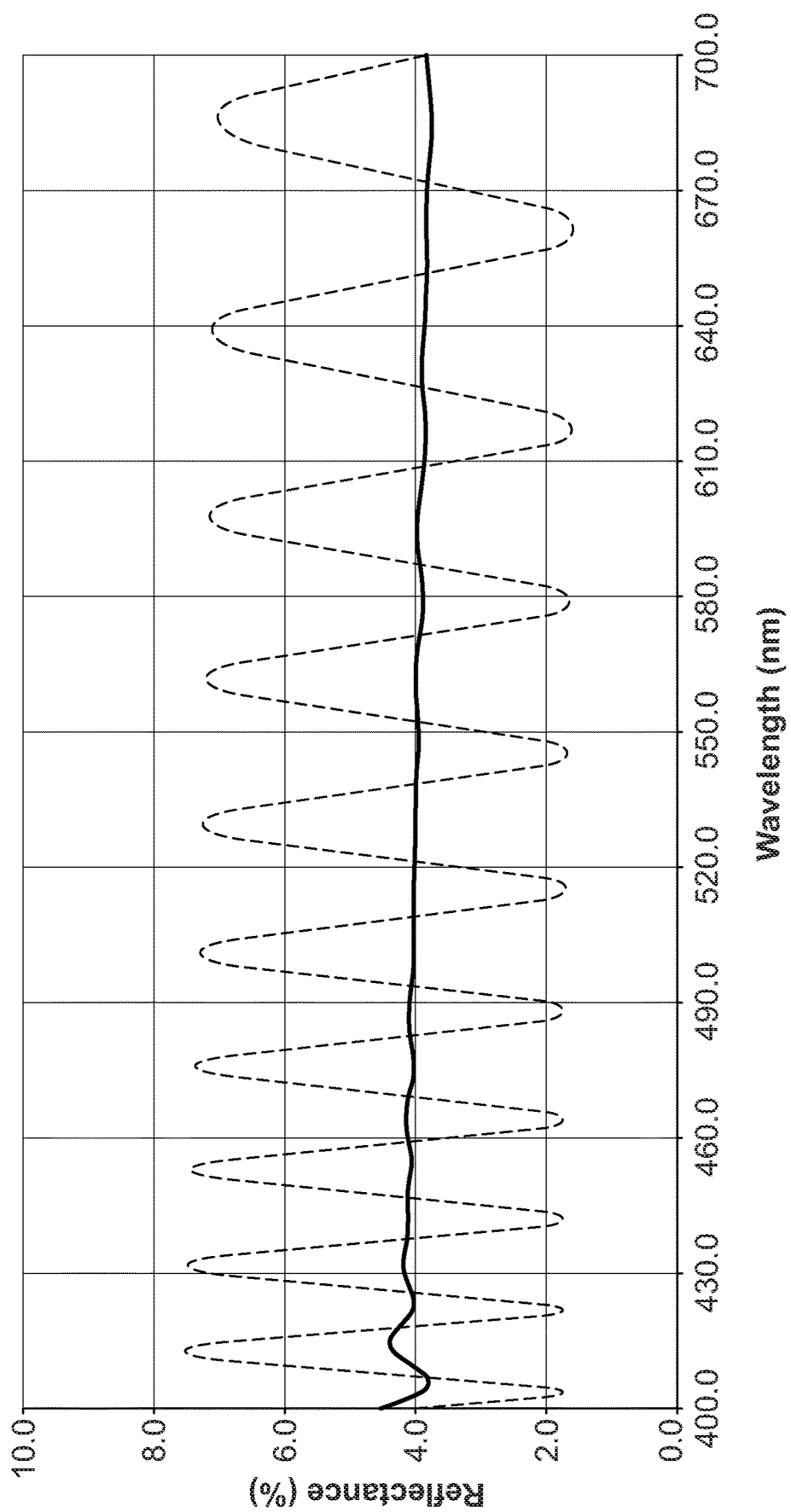
FIG. 2 shows the interference spectrum of the high refractive index lens of the invention of Example 1 coated with anti-scratch lacquer having a refractive index lower than that one of the lens.

FIG. 2 shows the evaluation results of the interference of both coated lenses, i.e. both the one of the lens coated according to the invention (continuous line) and the one of the prior art (dashed line). As can be seen from FIG. 2, remarkable interferences appeared in the lens coated according to the prior art, while the interference was practically absent in the lens of the invention.

Since after application of the lacquer layer, a layer of material having anti-reflection properties is usually applied in order to improve the transmittance of the lens and the aesthetic effect of the lens thereof in presence of frontal illumination, an anti-reflection treatment consisting of 4 alternating layers of titanium oxide ($Ti_3O_5$) and silicon oxide ($SiO_2$) has been applied both on the lens of the prior art and on the lens of the invention.

Above both lenses a top coat as a water/oil repellent was applied.

Figure 3:
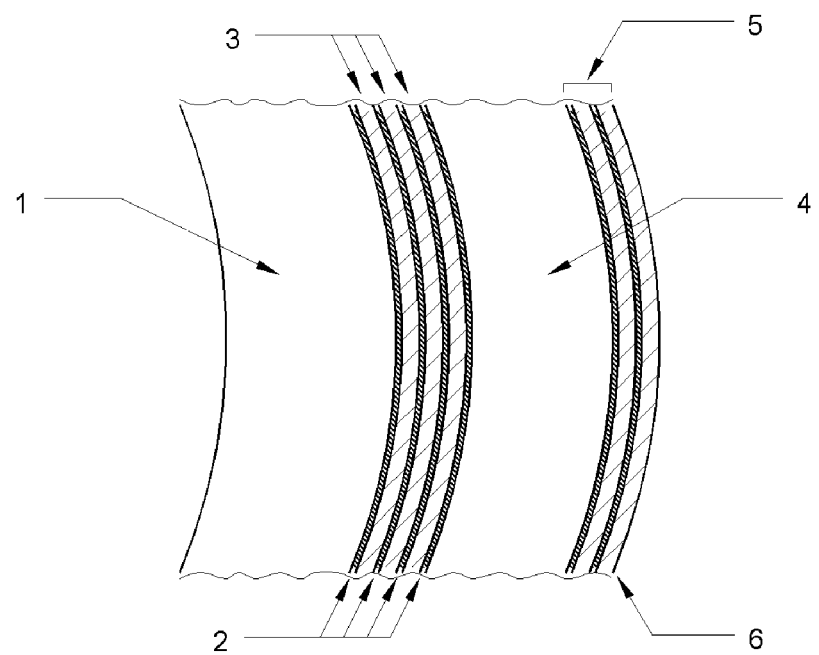
FIG. 3 shows the scheme of the final lens of Example 1, coated with anti-scratch lacquer having a refractive index lower than that one of the aforesaid lens, and with an anti-reflection agent and top coat.

FIG. 3 shows the scheme of the lens coated according to the invention and also coated with an anti-reflection layer and a top coat.

FIG. 3 shows hence the scheme of the prepared lens with coating layer, anti-scratch lacquer, anti-reflection layer and top coat. Specifically, the layer indicated with 1 is the lens, the four Zirconium oxide sub-layers of the coating layer (preferably with refractive index of 2.05) are indicated with number 2, the three Silicon oxide substrates of the coating layer (preferably with a refractive index of 1.46) are indicated with number 3, the anti-scratch lacquer layer is indicated with number 4, the anti-reflection layer is indicated with number 5 and the top layer is indicated with number 6.

Specifically, the final lens structure with the coating layer of the invention was:

| Coating Layer | Refractive Index Lens 1.74 | Thickness (nm) / |
|---|---|---|
| Zirconium dioxide (ZrO$_2$) | 2.05-1.95 | 10.0 |
| Silicon dioxide (SiO$_2$) | 1.47-1.46 | 25.0 |
| Zirconium dioxide (ZrO$_2$) | 2.05-1.95 | 21.2 |
| Silicon dioxide (SiO$_2$) | 1.47-1.46 | 39.3 |
| Zirconium dioxide (ZrO$_2$) | 2.05-1.95 | 15.5 |
| Silicon dioxide (SiO$_2$) | 1.47-1.46 | 49.8 |
| Zirconium dioxide (ZrO$_2$) | 2.05-1.95 | 5.0 |
| Anti-scratch Lacquer Layer | 1.51 | 4000 |
| Anti-reflection Layer (Green) | MultiCoat STD | |
| Titanium dioxide (Ti$_3$O$_5$) | 2.25 | 9.0 |
| Silicon dioxide (SiO$_2$) | 1.467 | 28.0 |
| Titanium dioxide (Ti$_3$O$_5$) | 2.25 | 112.0 |
| Silicon dioxide (SiO$_2$) | 1.467 | 82.0 |
| Top Coat (W/O repellent) | 1.36 | 5.0 |

The comparison lens was the same lens but without the coating layer of the invention.

Figure 4:
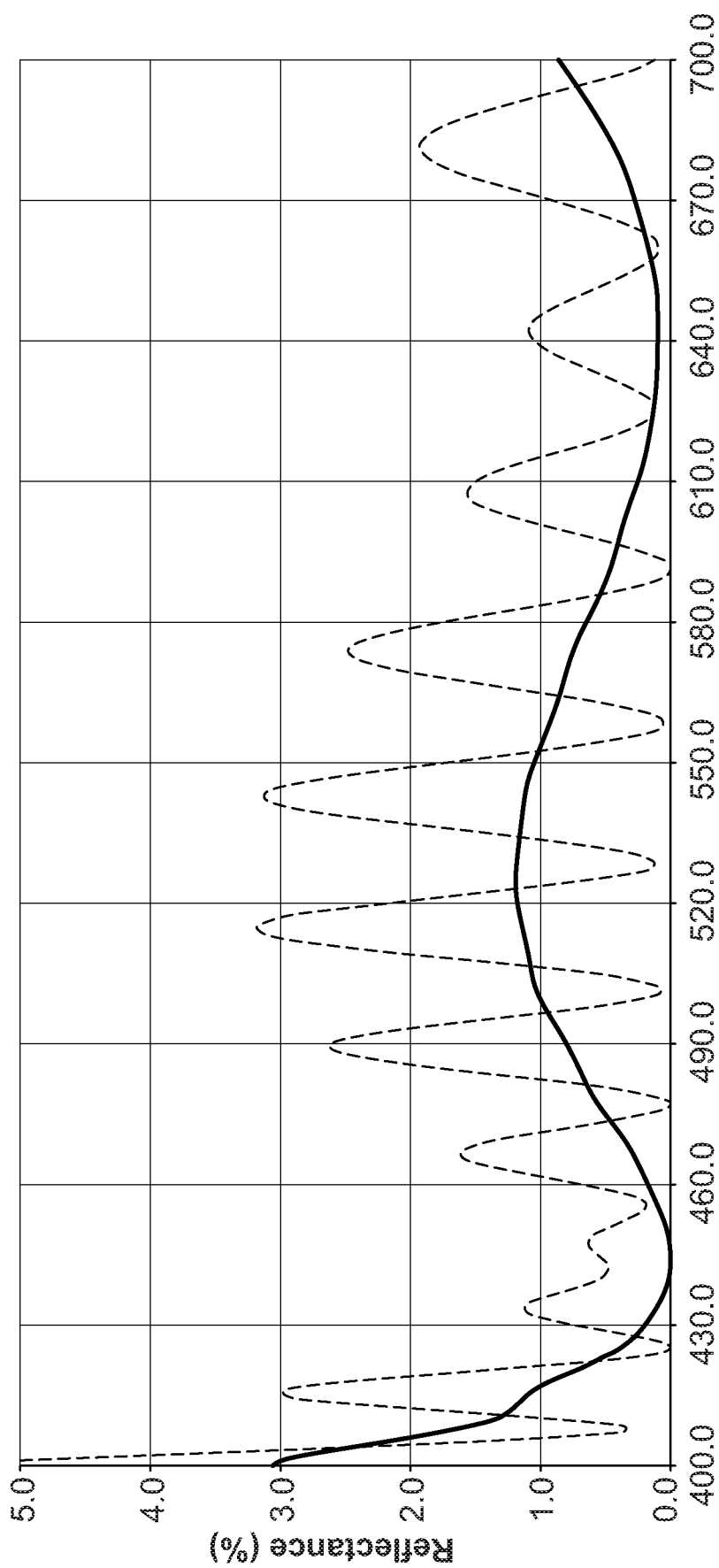
FIG. 4 shows the interference spectrum of the lens of Example 1 coated with anti-scratch lacquer with a refractive index lower than that one of the lens, which is further coated with an anti-reflection agent and a top coat.

FIG. 4 shows the interference evaluation of both lenses, i.e the one of the invention (continuous line) having the coating layer and the one of the prior art as comparison (dashed line). The benefit of the treatment to reduce iridescence was thus evident from FIG. 4, where in case of the prior art lens (dashed line) the interferences were increased due to the successive further coating layers. The lens according to the invention, on the other hand, was advantageously free of interference.

The inventors noticed that the elimination of iridescence caused by the anti-scratch lacquer allowed to improve not only the final aesthetic properties of the lens, but also its transmittance properties in presence of frontal light.

The invention claimed is:

1. A lens having a refractive index $\eta_1$ coated at least partially on at least one surface thereof with an anti-scratch lacquer layer having a refractive index $\eta_2$ lower than $\eta_1$, wherein between said lens and said anti-scratch lacquer layer a coating layer comprising at least 3 sub-layers, each of said at least 3 sub-layers consisting of one compound selected from the group consisting of Zirconium oxide, Silicon oxide, Titanium oxide, Tantalum oxide, Iridium oxide, Silver oxide and Magnesium fluoride is present,
   wherein each of said at least 3 sub-layers has a thickness lower than or equal to 100 nm and
   wherein the coating layer comprising said at least 3 sub-layers is present as a combination of repetition of alternance of a sub-layer of a compound having a refractive index higher than and a sub-layer of a compound having a refractive index lower than the refractive index of the lens.

2. The coated lens of claim 1, wherein said anti-scratch lacquer is also a photochromatic lacquer or a coloured lacquer.

3. The coated lens according to claim 1, wherein said coating layer comprises from 3 to 11 sub-layers.

4. The coated lens according to claim 1, wherein said coating layer has at least three sub-layers with a thickness from 2 to 80 nm.

5. The coated lens according to claim 1, wherein said anti-scratch lacquer layer is present with a thickness in the range from 1 to 4 micrometres.

6. The coated lens according to claim 1, wherein a further anti-reflection coating is present on the anti-scratch lacquer layer.

7. The coated lens according to claim 1, wherein a further coating with water/oil repellent properties is present on the anti-scratch lacquer layer.

8. The coated lens according to claim 1, wherein said coating layer comprises the alternance of sub-layers of Zirconium oxide and Silicon oxide.

9. The coated lens according to claim 8, wherein said coating layer comprises about 7 sub-layers.

10. The coated lens according to claim 1, wherein the refractive index $\eta_1$ of the lens is in the range of 1.50-1.90.

11. The coated lens according to claim 10, wherein the refractive index $\eta_1$ of the lens is in the range of 1.70-1.90.

12. The coated lens according to claim 10, wherein the refractive index $\eta_1$ of the lens is 1.74.

13. A method for reducing or eliminating the iridescence phenomenon of a lens having a refractive index $\eta_1$, coated at least partially on at least one surface thereof with an anti-scratch lacquer layer having a refractive index $\eta_2$ lower than the refracting index $\eta_1$ of the lens, said method comprising the following steps:
   a) providing a lens having a refractive index $\eta_1$;
   b) applying at least partially on the at least one surface of the lens a coating layer comprising at least 3 sub-layers, each of said at least 3 sub-layers consisting of one compound selected from the group consisting of Zirconium oxide, Silicon oxide, Titanium oxide, Tantalum oxide, Iridium oxide, Silver oxide and Magnesium fluoride by a technique which ensures a thickness of each of said at least 3 sub-layers lower than or equal to 100 nm;
   c) applying on said coating layer obtained in step b) an anti-scratch lacquer layer having a refractive index $\eta_2$ lower than $\eta_1$,
   wherein the coating layer comprising at least 3 sub-layers is present as a combination of repetition of alternance of a sub-layer of a compound having a refractive index higher than and a sub-layer of a compound having a refractive index lower than the refractive index of the lens.

14. The method according to claim 13, wherein the anti-scratch lacquer layer is also a photochromatic lacquer layer or a coloured lacquer layer.

15. The method according to claim 13, wherein said layer of step b) comprises from 3 to 11 sub-layers.

16. The method according to claim 13, wherein, after applying a layer of anti-scratch lacquer, an upper anti-reflection coating layer is applied.

17. The method according to claim 13, wherein after applying a layer of anti-scratch lacquer a top coat with water/oil repellent properties is applied.

18. The method according to claim 13, wherein the application/deposition technique, which ensures a thickness of each of said at least three sub-layers of step b), is a technique having a deposition precision of at least 0.5 nm of thickness.

19. The method according to claim 18, wherein the application/deposition technique is PVD (Physical Vapor Deposition).

* * * * *